US006423390B1

(12) United States Patent
Harden

(10) Patent No.: US 6,423,390 B1
(45) Date of Patent: Jul. 23, 2002

(54) PATTERN POUCH LABEL

(75) Inventor: John M. Harden, Oxford, NC (US)

(73) Assignee: The Standard Register Company, Dayton, OH (US)

(*) Notice: Subject to any disclaimer, the term of this patent is extended or adjusted under 35 U.S.C. 154(b) by 0 days.

(21) Appl. No.: 09/532,429

(22) Filed: Mar. 23, 2000

(51) Int. Cl.[7] .............................. B32B 7/06; B32B 7/10; B32B 7/14; G09F 3/00; G09F 3/10

(52) U.S. Cl. .................... 428/40.1; 428/41.7; 428/41.8; 428/42.2; 428/43; 428/343; 283/81; 156/291

(58) Field of Search ............................... 428/40.1, 41.7, 428/41.8, 42.1, 42.2, 43, 68, 121, 131, 343; 281/2, 5, 14; 462/6, 26; 229/300; 283/81; 156/291

(56) References Cited

U.S. PATENT DOCUMENTS

| | | | | |
|---|---|---|---|---|
| 2,156,142 A | | 4/1939 | Blitz | |
| 3,224,640 A | | 12/1965 | Schneider et al. | |
| 4,312,473 A | | 1/1982 | Hoeller | |
| 4,643,451 A | | 2/1987 | Coates | |
| 4,676,526 A | | 6/1987 | Redman | |
| 4,868,027 A | | 9/1989 | Hunkeler et al. | |
| 4,927,179 A | | 5/1990 | Ehret et al. | |
| 5,297,993 A | * | 3/1994 | Gullett et al. | 462/6 |
| 5,624,069 A | | 4/1997 | Coats et al. | |
| 5,737,775 A | | 4/1998 | Schwartz | |
| 5,776,571 A | | 7/1998 | Michlin et al. | |

* cited by examiner

*Primary Examiner*—Shrive P. Beck
*Assistant Examiner*—Elena Tsoy
(74) *Attorney, Agent, or Firm*—Killworth, Gottman, Hagan & Schaeff LLP

(57) ABSTRACT

A pouch label is constructed from only two plies, provides two distinct pockets, and can optionally provide additional labels or printed material including forms. The first ply forms the label ply while the second ply is a liner ply die cut into at least two component parts, such that a first liner portion is circumscribed by a second liner portion. An adhesive is applied between the label ply and the liner ply such that the second liner ply portion is releasably held against the label ply, and only a portion of the periphery of the first liner ply portion is secured to the label ply such that a pouch is formed with the back of the label ply. The pouch is formed because there is no adhesive within the perimeter of the first liner portion. The label ply preferably includes at least one line of weakening scored across the pouch portion and positioned such that tearing the label ply along the line of weakening opens the pouch formed between the label ply and the first liner ply. Further, a tab portion juxtaposed with the pouch portion of the label ply adjacent to the pouch opening can be provided to ease placement, stuffing and sealing the pouch portion of the label.

27 Claims, 3 Drawing Sheets

PATTERN POUCH LABEL

BACKGROUND OF THE INVENTION

1. Technical Field of the Invention

The present invention relates in general to a shipping label, and more particularly to a shipping label provided with two distinct pouch portions.

2. Description of the Related Art

Labels are widely used to identify pertinent information on items including packages and containers. One type of label that is well known is the pocket label. The pocket label is formed from a first and second ply sealed permanently about three edges forming a pocket or envelope portion. An adhesive is applied to the back surface of the second ply, which is temporarily covered by a removable liner ply, thus requiring three plies to form the pocket label. To use the pocket label, a user removes the temporary liner ply exposing the adhesive on the back of the second ply. The label is then firmly pressed against a package. Finally, a user may place items such as shipping documents, package content lists, invoices or other information therein, then seal up the envelope with an adhesive strip.

Unfortunately, the typical pocket label usually requires that the label be stuffed with the desired contents subsequent to affixing the label to the package. Additionally, only one pocket is formed. While this is satisfactory under some circumstances, certain applications require separate pouch portions and additional labels. This is costly not only in the number of labels, pouches and other products required, but in the waste materials generated, and the labor involved in organizing and applying the labels.

Accordingly, there is a need for a pouch label with two distinct pocket portions that can be stuffed either prior to or subsequent to affixing the label to a package. Preferably, the label includes a pouch portion and separable labels or required forms on a single sheet, can be pre-printed or capable of receiving user variable imaging, and is economical to produce and simple to use.

BRIEF SUMMARY OF THE INVENTION

This need is met by the present invention wherein a pouch label is formed from only two plies, provides two distinct pockets, and can optionally provide additional labels or printed material including forms. Briefly, a first ply forms the label ply while a second ply is a liner ply die cut into two component parts, such that a first liner portion is circumscribed by a second liner portion. An adhesive is applied between the label ply and the liner ply such that the second liner ply portion is releasably held against the label ply, and only a portion of the periphery of the first liner ply portion is secured to the label ply such that a pouch is formed with the back of the label ply. The pouch is formed because there is no adhesive within the perimeter of the first liner portion.

In use, a user peels the liner ply second portion from the label ply. Because of the die cut in the liner ply and because a portion of the first liner portion periphery is adhered to the label ply, the second liner portion separates from the first liner portion along the die cut, and pulls away from the label ply while the first liner ply remains adhered to the label ply. The label is placed on a package thus actually creating two pouches, a first pouch between the label ply and the first liner portion, and a second pouch between the first liner portion and the container. Once the pouches are stuffed, the portion of the label that forms the pouch opening is sealed. Further, the pouch created between the label ply and the first liner portion can be stuffed either prior to or subsequent to the label being applied to the container. Combining two distinct pocket portions is advantageous because it allows a user to separate, for example a bill of lading from an invoice.

In accordance with one embodiment of the present invention, a pouch label is formed by superposing a label ply on a liner ply. The liner ply is separable into a first liner portion and a second liner portion where the first liner portion is circumscribed by the second liner portion. Any suitable means can be used to separate the liner ply into two separable portions including die cutting. An adhesive is applied between the label ply and the liner ply such that the second liner portion is releasably held to the label ply and the first liner portion is secured to said label ply adjacent the first liner periphery such that the first liner portion and the label ply form a pouch therebetween. There is no adhesive inside the pouch portion. Preferably, the label ply has at least one line of weakening across the label and positioned such that tearing the label ply along the line of weakening opens the pouch formed between the label ply and the first liner ply. The pouch label preferably includes a tab portion juxtaposed with the pouch portion of the label ply adjacent to the pouch opening. A third liner portion is die cut from the second liner portion and positioned near the first liner portion that forms the pouch opening such that it encompasses the tab portion of the label ply. Adhesive releasably adheres the tab portion of the label ply to the third liner portion and further avoids the area of the second liner portion between the first liner portion and the third liner portion.

In accordance with another embodiment of the present invention, the pouch label includes one or more separable label portions in addition to the pouch label portion. The additional labels are die cut from a portion of the label ply that is superposed on top of the second portion of the liner ply. Further, the additional labels can be either pre-printed or receive user variable imaging by a device including sheet fed laser and ink jet printers.

In accordance with yet another embodiment of the present invention, the pouch label is a combination form and two pouch label. The form portion can be pre-printed or receive user variable imaging by a device including sheet fed laser and ink jet printers. Preferably, at least one line of weakening is provided between the form portion and the pouch label portion so that the form portion may be easily separable from the pouch label portion. The pouch label portion may further include additional labels, and a tab portion.

Accordingly, it is an object of the present invention provide a pocket label that can be stuffed either prior to, or subsequent to, affixing the label to the package.

It is another object of the present invention to provide a label that can be preprinted, or that can receive user variable imaging.

It is yet another object of the present invention to provide a label that has two distinct pouch portions and additionally, separate and distinct labels.

It is yet another object of the present invention to provide a label that has a two part pouch portion and, additionally, a separate and distinct form portion.

It is yet another object of the present invention to provide a pouch label that is economical to produce and simple to use.

Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

The Pouch Label

Figure 1:
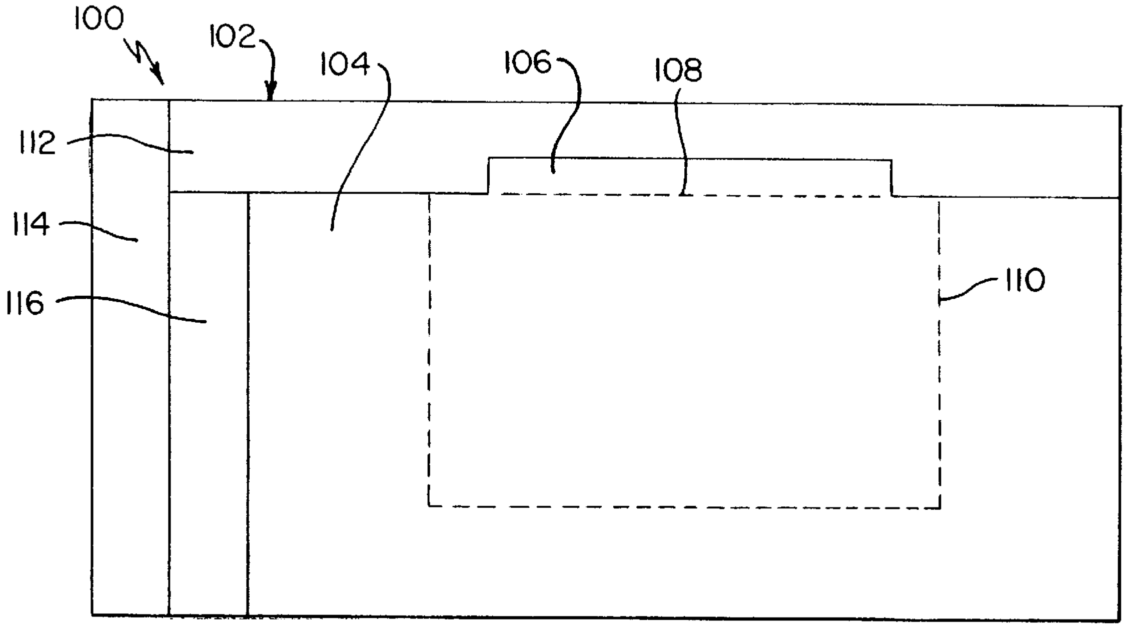
FIG. 1 is an illustration of a typical label ply side of a pouch label in accordance with the present invention, including a pull tab, perforation lines for opening the pouch and additional label portions.
Figure 2:
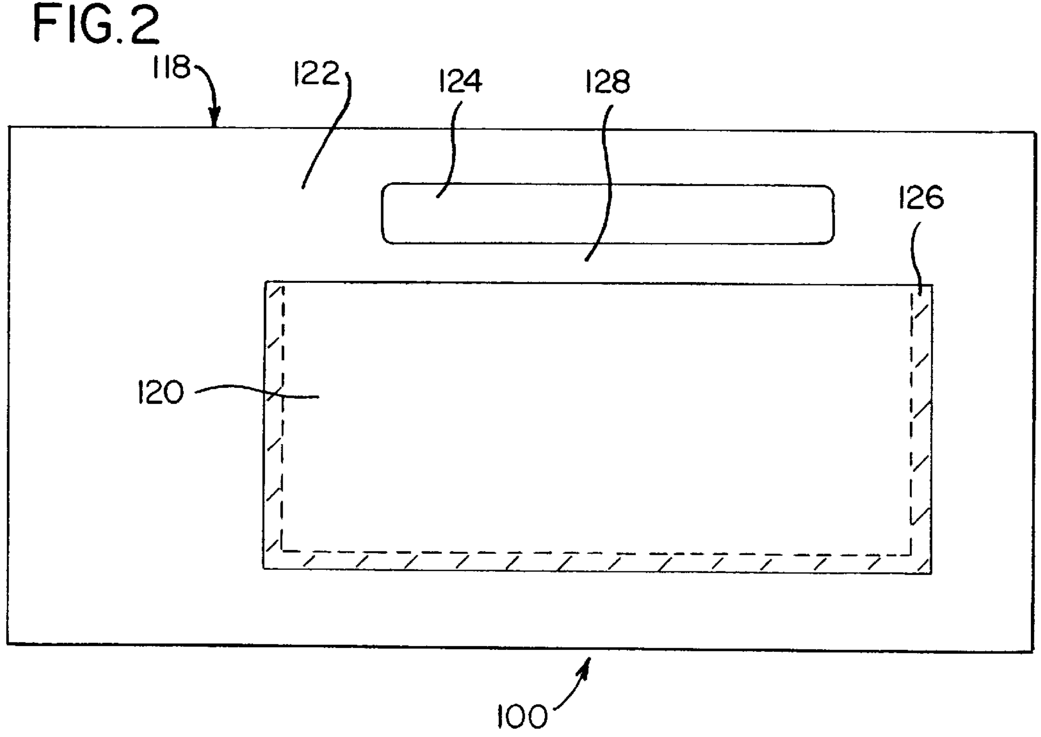
FIG. 2 is an illustration of a typical liner ply for the label ply of FIG. 1.

Referring initially to FIG. 1 and FIG. 2, the pouch label 100 according to the present invention comprises two plies, a label ply 102 superposed upon a liner ply 118.

While the plies are shown in FIG. 1 and FIG. 2 in a substantially rectangular shape, it should be pointed out that they can be of any geometry and size to suit user requirements.

As shown in FIG. 1, the label ply is divided into a label pouch portion 104, and a series of separable label portions, or label remaining portions, 112, 114, and 116. It should be pointed out that label portions 112, 114, and 116 are not required, depending upon the use to which the pouch label is to be put. Further, while shown as three additional labels, it should be pointed out that any number of labels in any size can be formed above, below, to the left, or to the right of the pouch label portion. The optional label portions can be preprinted or, alternatively, can receive user variable imaging using any printing device, including for example laser and ink jet printers. Examples of suitable uses for additional labels would include a signature line to accompany the pouch label portion, providing instructions to a recipient, or providing bar coded information. Label portion 104 forms the pouch label. Perforation lines 108 and 110 are optional and serve the purpose of providing a convenient arrangement for opening the pouch. The optional tab portion 106 provides an easy way to seal the pouch portions, once the pouch portions are filled. The tab portion 106 can be constructed of any geometry, but usually includes a generally rectangular strip juxtaposed with the pouch portion 104 adjacent the pouch opening. An example of a suitable arrangement is shown in FIG. 1 and FIG. 2.

Figure 5:
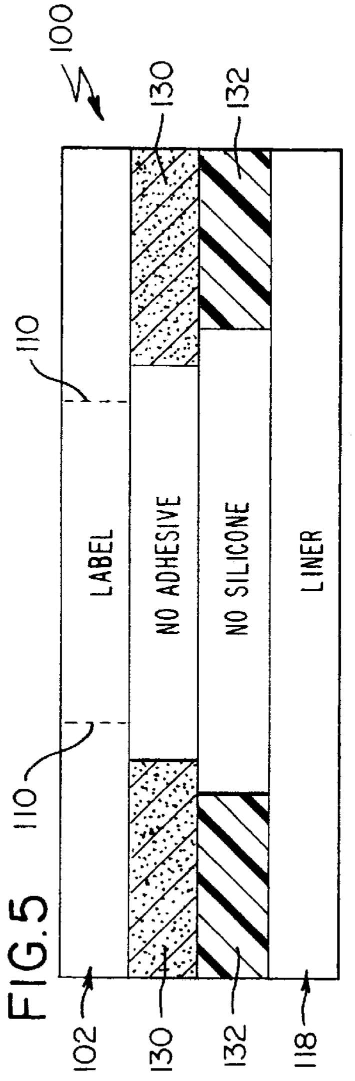
FIG. 5 is an illustration of a cross-sectional view of the label shown in FIG. 1.

Referring to FIG. 2, it may be seen that the liner ply 118 is die cut into three separable portions. The first liner portion 120 is circumscribed by the second liner portion 122. Further, first liner portion 120 is positioned such that it is encompassed by the label pouch portion 104 of the label ply 102. A third liner portion 124 is optionally included if the label ply 102 includes a tab portion 106. The third liner portion 124 is die cut from the second liner portion 122 and is positioned to encompass the label ply tab portion 106. Referring to FIGS. 1, 2 and 5, the adhesive 130 is applied between the label ply 102 and the liner ply 118 such that adhesive 130 substantially covers all of the second liner portion 122 except for the region 128 between the third liner portion 124 and the first liner portion 120. Additionally, adhesive 130 is applied between the label ply tab portion 106 and the liner ply third portion 124. Lastly, adhesive 130 is applied between the first liner portion 120 and the label ply pouch portion 104 adjacent the first liner portion periphery 126 such that a pouch is formed therebetween. While the pouch in FIG. 1 and FIG. 2 is formed from a rectangular portion of the liner ply 118, the pouch may be configured in any desired shape. Further, the pouch opening can be oriented in any direction.

In operation, a user peels the label ply pouch portion 104 from the second liner portion 122 of liner ply 118. Because of the die cuts in the label ply 102 and the liner ply 118, the second liner portion 122 separates from the label ply pouch portion 104. First liner portion 120 remains adhered to label pouch portion 104, and third liner portion 124 remains adhered to the pouch label portion 104 along the area defining the tab portion 106. The optional, extra label ply portions including 112, 114 and 116 may remain adhered to the second liner ply. The pouch label is firmly pressed against the container to receive the label. The first pouch, defined as the region between the label pouch portion 104 and the first liner portion 120, will have optionally been previously filled with the intended item or items or, alternately, items may be placed in the pouch at this time. Further, a second pouch, defined by the region between the first liner portion 120 and the surface of the container the label was placed upon, can now be stuffed if desired. When all desired contents are placed in both pouches, the third liner portion 124, encompassing tab portion 106 of pouch label portion 104, is removed, and the tab portion 106 is firmly pressed down, effectively sealing the contents in the pouch label.

To open the pouch label revealing the content of both pouches, a user tears open the pouch portion. To facilitate opening the pouch label, perforation lines can be added to the pouch label ply 104. An example of suitable perforation lines are illustrated in FIG. 1. Perforation line 108 is scored along the edge defining the boundary between the label ply tab portion 106 and the label ply pouch portion 104. While one line of weakening, or perforation line, is sufficient, additional lines of weakening 110 can be scored in the label ply pouch portion 104 in any pattern. For example, the label pouch portion can be opened by either ripping or cutting along perforation line 108 to open the pouch. By including optional perforation lines 110, the first pouch can be opened further by pulling downward on the pouch.

Referring to FIGS. 1, 2 and 5, the liner ply 118 is separated into at least two portions. A first liner portion 120 is circumscribed by a second liner portion 122. The first liner portion 120 forms a pouch with the back side of the label ply pouch portion 104. The size and shape of the first liner portion 120 can be selected to suit any specific needs including the size and dimensions of the contents intended to be placed in the pouch. An adhesive 130 is applied between the label ply pouch portion 104 and the first liner portion 120 adjacent the first liner periphery 126 such that a pouch is formed therebetween. The adhesive 130 applied to the perimeter 126 of the first liner portion 120 should be sufficient to form a suitable pouch with label ply pouch portion 104. This can be accomplished by applying the adhesive 130 in any suitable manner including a continuous strip, a discontinuous line of segments or a discontinuous line of spots. An example of a suitable arrangement is shown in FIG. 2. The first liner portion 120 is substantially rectangular in shape. An adhesive 130 is applied in a continuous strip 126 between the label ply 104 and the first liner portion 120 adjacent three edges of first liner ply 120 including the bottom edge and both side edges. There is no adhesive applied along the top edge thus forming a pocket portion between the label ply 104 and the first liner portion 120. Further, the adhesive 130 can be applied using any thickness depending upon user requirements. An example of a suitable thickness would include a width substantially between ⅛ inches and ¼ inches wide.

Figure 3:
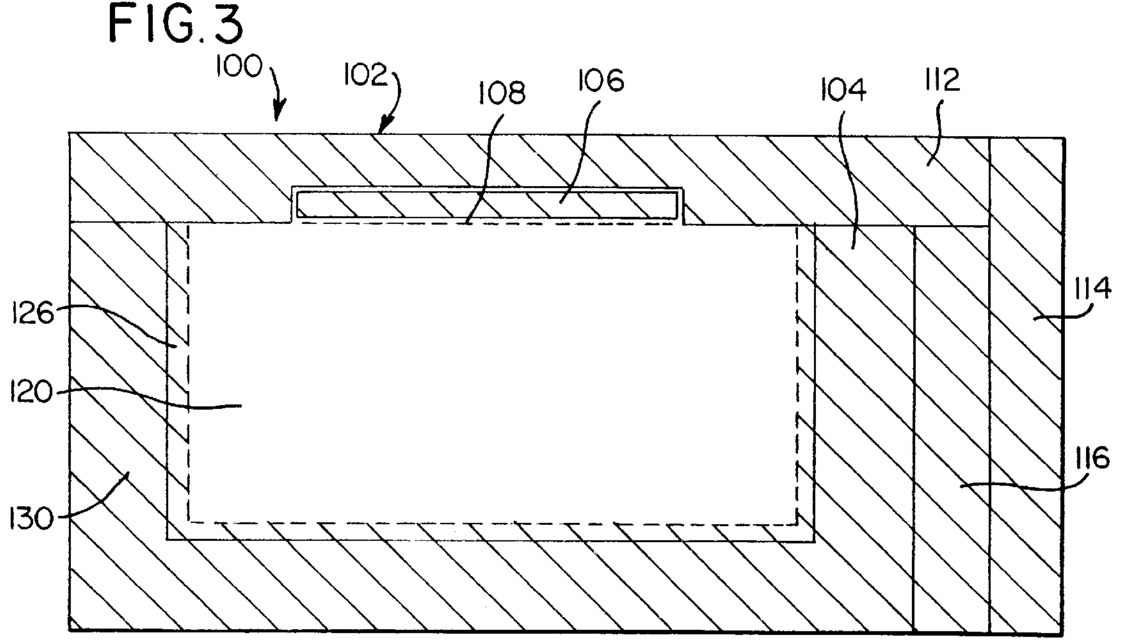
FIG. 3 is an illustration of the back side of the label ply and includes the portion of the liner ply that forms the pouch with the label ply demonstrating a typical pattern for applying adhesive between the label ply and liner ply of the label shown in FIG. 1.

Referring to FIG. 3, the arrangement of adhesive 130 is illustrated. FIG. 3 illustrates the back side of the label ply 102 and includes the first liner portion 120 superposed on top of pouch label portion 104 to demonstrate an example of a suitable arrangement for the pattern of the adhesive 130. Adhesive 130 is applied in the regions designated with the negative sloped diagonal lines. There is no adhesive within the periphery of the pouch portion formed by first liner portion 120. Optionally, the perimeter of the label 102 can be made free of adhesive to facilitate peeling the two plies apart.

Figure 4:
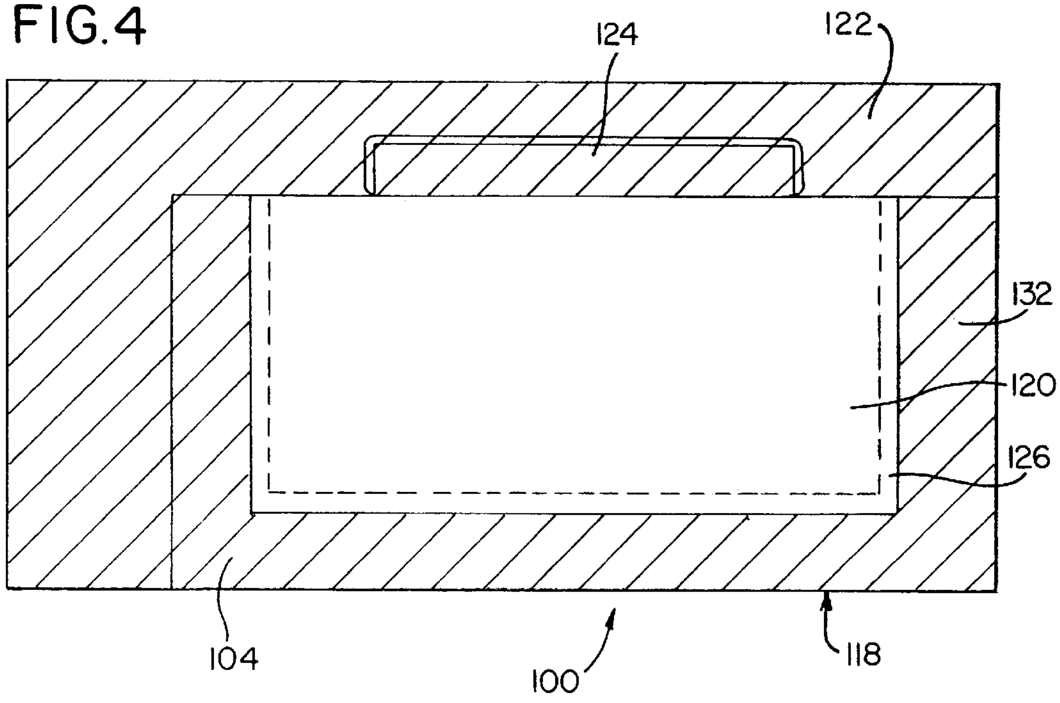
FIG. 4 is an illustration of the front side of a typical liner ply and includes a tracing of the pouch portion of the label ply demonstrating a pattern for applying silicone to the liner ply of the label shown in FIG. 1.

Referring to FIG. 4, the liner ply 118 may be coated with silicone 132. Silicone 132 applied to the liner ply is well known in the art as a means to separate the label ply from the liner ply where the adhesiveness is retained by the label ply. Illustrated in FIG. 4 is an example of a suitable pattern for placement of the silicone 132. Silicone is applied in the regions designated with the positive sloped diagonal lines. Forming the pattern whereby silicone is excluded from the region designated by the first liner portion 120 is not required. Silicone may optionally be applied to the entire surface of liner ply 118. A particular application may realize savings by only placing the release coating, or silicone coating 132 as needed. Additionally, the pattern allows non-coated areas for the adhesive to adhere permanently to portions of the liner ply 118, such as along the periphery of the first liner portion 120.

Referring now to FIG. 5, the label 100 is illustrated in a cross sectional view. The top layer is the label ply 102, and more particularly, the pouch portion 104. The second layer from the top is the layer of adhesive 130. The layer of adhesive 130 is applied between label ply 102 and liner ply 118 except for the area within the perimeter of the first liner portion 120. The third layer from the top represents the layer of silicone 132 applied to the liner ply 118. It is observed that the silicone 132 is applied to the surface of the liner ply 118 in a pattern similar to the adhesive 130, except for the first liner portion periphery 126 which represents the area of the liner ply 118 that lies inside the pouch formed between the label ply pouch portion 104 and the liner ply 118. This allows the adhesive 130 applied along the first liner periphery 126 to permanently adhere the first liner portion 120 to the label ply portion 104. It should be noted that this is optional. The pattern is not required for the present invention. Depending upon factors such as cost and convenience, the entire liner ply 118 can be coated with silicone 132.

The Combination Form Pouch Label

Figure 6:
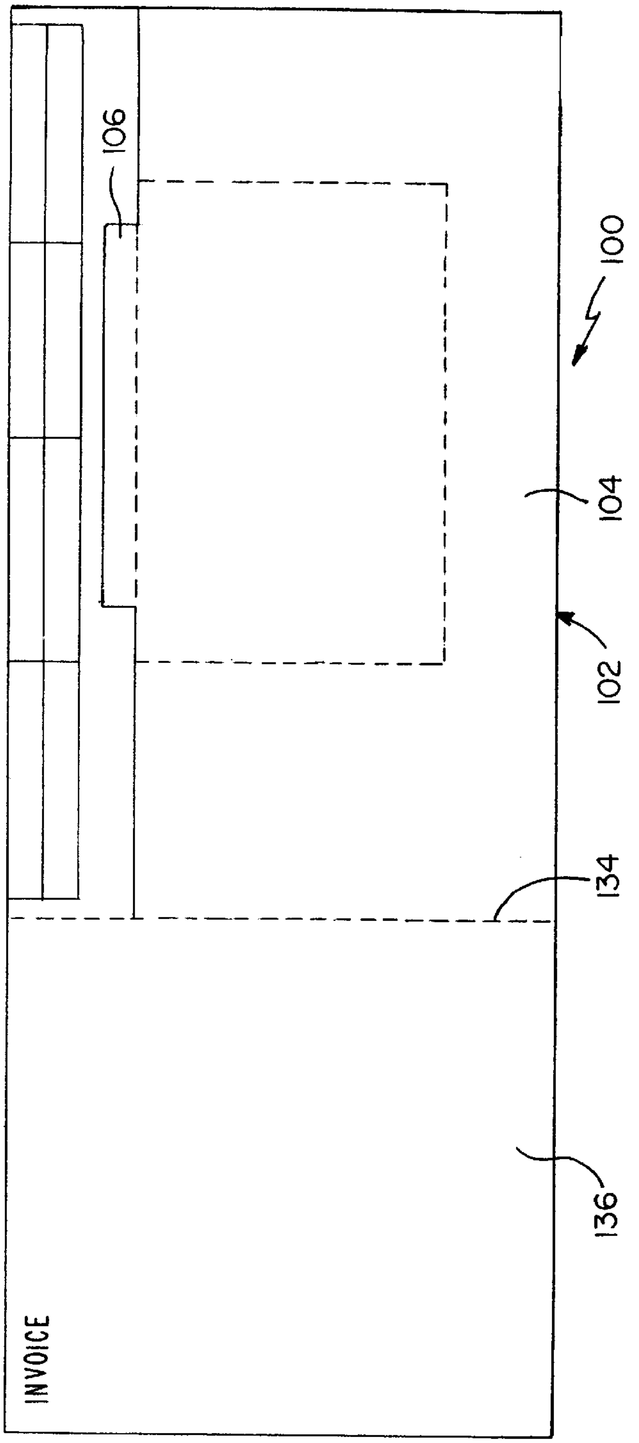
FIG. 6 is an illustration of a shipping pouch label with a pouch portion and a form separable along a perforation line.

The label 100 can optionally include a form part. Such an embodiment is illustrated in FIG. 6. Preferably, a perforation line 134 is positioned along the boundary dividing the form portion 136 from the pouch portion 104. Further, the liner ply 118 can be dimensioned in any configuration to suit user requirements. In a first example, the label ply 102, and more particularly the label portion 104, is superposed upon the liner ply 118 such that the liner ply 118 covers only the pouch and label portions of the label ply 102. In a second example, the liner ply 118 is of similar dimensions to the label ply 102, such that the form is substantially co-planar. The label ply 102 is optionally preprinted and is further capable of receiving user variable printing. This embodiment may be used to provide either an invoice or a bill of lading form and a pouch label in a single sheet. Once the appropriate information is entered onto the form part 136, by printing, using devices such as a laser printer, ink jet printer or the like, the form portion 136 can be separated from the pouch portion 104 by tearing it along the perforation 134, then stuffed it into the pouch. Further, additional labels can be included on the label ply 102 in addition to the form as discussed above. For example, in a warehousing operation, automatic ship notice (ASN) labels, bar coded carton information, the bill of lading, and a pouch label for the shipment can be prepared on a single sheet.

Having described the invention in detail and by reference to preferred embodiments thereof, it will be apparent that modifications and variations are possible without departing from the scope of the invention defined in the appended claims.

What is claimed is:

1. A pouch label comprising:

a label ply;

a liner ply separable into a first liner portion and a second liner portion;

said first liner portion having a first liner periphery;

said label ply superposed on said liner ply; and adhesive applied between said label ply and said liner ply such that said label ply is releasably held to said second liner portion, and said first liner portion is permanently secured to said label ply adjacent said first liner periphery such that said first liner portion and said label ply form a pouch therebetween.

2. A pouch label according to claim 1 wherein said label ply defines at least one line of weakening such that tearing said label ply along said line of weakening opens said pouch formed between said label ply and said first liner portion.

3. A pouch label according to claim 1 wherein:

said label ply further comprises a separable label pouch portion and one or more separable label portions; and said label pouch portion exceeds said first liner portion in dimensions and is positioned so as to encompass said first liner portion.

4. A pouch label according to claim 3 wherein:

said label pouch portion further comprises a tab portion;

said second liner portion further comprises a separable third liner portion, said third liner portion positioned so as to encompass said tab portion of said label pouch portion; and wherein said adhesive releasably adheres said tab portion to said third liner portion and further avoids the area of said second liner portion between said first liner portion and said third liner portion.

5. A pouch label according to claim 1 wherein said label ply further comprises a form portion and at least one line of weakening scored along said label ply adjacent said form portion.

6. A pouch label according to claim 5 wherein said label ply dimensions exceed said liner ply dimensions.

7. A pouch label according to claim 5 wherein said label ply and said liner ply are of substantially the same dimensions.

8. A pouch label according to claim 1 wherein said liner ply is separable by die cutting said liner ply.

9. A pouch label according to claim 1 wherein said liner ply is coated with silicone.

10. A pouch label according to claim 1 wherein said liner ply is coated with silicone, said silicone applied so as to surround said first liner portion.

11. A pouch label comprising:

a label ply;

a liner ply generally of similar dimensions to said label ply;

said label ply die cut into a label pouch portion and a label remaining portion;

said liner ply die cut into a first liner portion and a second liner portion, said first liner portion circumscribed by said second liner portion, and wherein said first liner portion is smaller in dimension than said label pouch portion;

said first liner portion having a first liner periphery;

said label ply superposed on said liner ply such that said first liner ply is encompassed by said label pouch portion; and adhesive applied between said label ply and said liner ply such that said label ply is releasably held to said second liner portion, and said first liner portion is secured to said label pouch portion.

12. A pouch label according to claim 11 wherein said first liner portion is secured to said label pouch portion adjacent said first liner periphery such that said first liner portion and said label pouch portion form a pouch therebetween.

13. A pouch label according to claim 11 wherein said label remaining portion comprises a plurality of die cut label portions.

14. A pouch label according to claim 11 wherein said label pouch portion defines at least one line of weakening such that tearing said label pouch portion along said line of weakening opens said pouch formed between said label pouch portion and said first liner ply.

15. A pouch label according to claim 11 wherein:

said label pouch portion further comprises a tab portion; and said second liner portion further comprises a die cut third liner portion, said third liner portion positioned near said first liner portion encompassing said tab portion;

wherein said adhesive releasably adheres said tab portion to said third liner portion and further avoids the area of said second liner portion between said first liner portion and said third liner portion.

16. A pouch label according to claim 11 wherein the dimensions of said label ply exceed the dimensions of said liner ply and said label ply further comprises at least one line of weakening scored along said label ply adjacent said liner ply.

17. A pouch label according to claim 11 wherein a silicone coating is applied to said liner ply.

18. A pouch label according to claim 11 wherein a silicone coating is applied to said second liner portion.

19. A pouch label comprising:

a first ply having a form portion, a label portion, and a line of weakening dividing said form portion from said label portion;

a liner ply having a liner ply periphery;

said label portion die cut into a label pouch portion and a label remaining portion;

said liner ply die cut into a first liner portion and a second liner portion, said first liner portion circumscribed by said second liner portion, and wherein said first liner portion is smaller in dimension than said label pouch portion;

said first liner portion having a first liner periphery;

said label portion superposed on said liner ply such that said first liner ply is encompassed by said label pouch portion; and adhesive applied between said first ply and said liner ply such that said label portion is releasably held to said second liner portion, and said first liner portion is secured to said label pouch portion adjacent said first liner periphery such that said first liner portion and said label pouch portion form a pouch therebetween.

20. A pouch label according to claim 19 wherein said label remaining portion comprises a plurality of die cut label portions.

21. A pouch label according to claim 19 wherein said label pouch portion defines at least one line of weakening such that tearing said label pouch portion along said line of weakening opens said pouch formed between said label pouch portion and said first liner ply.

22. A pouch label according to claim 19 wherein:

said label pouch portion further comprises a tab portion;

said second liner portion further comprises a die cut third liner portion, said third liner portion positioned near said first liner portion encompassing said tab portion; and wherein said adhesive releasably adheres said tab portion to said third liner portion and further avoids the area of said second liner portion between said first liner portion and said third liner portion.

23. A pouch label comprising: a label ply;

a liner ply separable into a first liner portion and a second liner portion;

said first liner portion having a first liner periphery;

said label ply superposed on said liner ply; and adhesive applied between said label ply and said liner ply such that said label ply is releasably held to said second liner portion, and said first liner portion is permanently secured to said label ply adjacent said first liner periphery such that said first liner portion and said label ply form a pouch therebetween;

whereupon removing said second liner portion from said label ply, and pressing said label ply against an object such that said label ply adheres to said object, and said first liner portion lies in between said label ply and said object, a second pouch is formed between said first liner portion and said object.

24. A pouch label comprising:

a label ply;

a liner ply having:

a first liner portion having a first liner periphery;

a second liner portion; and, a release coating applied such that said release coating substantially covers said second liner portion and is excluded from said first liner periphery;

said label ply superposed on said liner ply; and, adhesive applied between said label ply and said liner ply such that said label ply is releasably held to second liner portion, and said adhesive secures said label ply to said first liner portion adjacent to said first liner periphery such that said label ply and said first liner portion form a first pouch therebetween, whereupon removing said second liner portion from said label ply, and pressing said label ply against an object, a second pouch is formed between said first liner portion and the object.

25. A pouch label comprising:

a label ply;

a liner ply having:

a first liner portion having a first liner periphery; and, a second liner portion separable from said first liner portion arranged to surround said first liner portion;

said label ply superposed on said liner ply;

adhesive applied between said label ply and said liner ply such that said label ply is releasably held to said second liner portion, and said first liner portion is secured to said label ply adjacent said first liner periphery such that said first liner portion and said label ply form a first pouch therebetween; and, a perforation line across said label ply arranged such that after said second liner portion removed from said label ply and said label ply is adhered to an object such that a second pouch is defined between said first liner portion and the object, both said first and second pouches are opened when said label is tom at said perforation line.

26. A pouch label comprising:

a label ply;

a liner ply having:

a first liner portion having a first liner periphery; and, a second liner portion separable from said first liner portion arranged to circumscribe said first liner portion;

said label ply superposed on said liner ply;

adhesive applied between said label ply and said liner ply in a pattern such that said second liner portion is releasably held to said label ply, and there is no adhesive within said first liner periphery such that said label ply is permanently adhesively held to said first liner portion adjacent said first liner periphery defining a first pouch therebetween.

27. A pouch label comprising:

a label ply;

a liner ply having:

a first liner portion having a first liner periphery; and, a second liner portion separable from said first liner portion;

said label ply superposed on said liner ply;

adhesive applied between said label ply and said liner ply in a pattern such that there is no adhesive within the periphery of said first liner portion such that said label ply is adhesively held to said first liner ply only adjacent said first liner periphery defining a first pouch therebetween; and, a release coating applied to said liner in a pattern such that said second portion is releasably held to said label ply, and at least a portion of said first liner periphery is a non-coated area of said release coating such that said adhesive adheres permanently to at least a portion of said first liner periphery.

* * * * *

UNITED STATES PATENT AND TRADEMARK OFFICE

CERTIFICATE OF CORRECTION

PATENT NO. : 6,423,390 B1
DATED : July 23, 2002
INVENTOR(S) : John M. Harden

It is certified that error appears in the above-identified patent and that said Letters Patent is hereby corrected as shown below:

Column 9,
Line 22, reads as "portion removed" should read -- portion is removed --
Line 26, reads as " is tom at" should read -- is torn at --

Signed and Sealed this

Eleventh Day of February, 2003

JAMES E. ROGAN
*Director of the United States Patent and Trademark Office*